United States Patent [19]

Vetter

[11] Patent Number: 5,113,912
[45] Date of Patent: May 19, 1992

[54] INFLATABLE CUSHION FOR SEALING OFF LEAKS IN CONTAINERS AND PIPES

[76] Inventor: Manfred Vetter, Burg Langendorf, D-5352 Zülpich, Fed. Rep. of Germany

[21] Appl. No.: 602,290
[22] PCT Filed: Apr. 25, 1989
[86] PCT No.: PCT/DE89/00264
 § 371 Date: Nov. 12, 1990
 § 102(e) Date: Nov. 12, 1990
[87] PCT Pub. No.: WO89/11061
 PCT Pub. Date: Nov. 16, 1989

[30] Foreign Application Priority Data

May 14, 1988 [DE] Fed. Rep. of Germany ....... 3816573

[51] Int. Cl.⁵ .............................................. F16L 55/16
[52] U.S. Cl. ........................................ 138/99; 138/97
[58] Field of Search ..................... 138/97, 99, 178; 29/402.14, 402.02, 402.09, 402.12; 264/36

[56] References Cited

U.S. PATENT DOCUMENTS

| | | | |
|---|---|---|---|
| 2,520,802 | 8/1950 | Hampton | 138/99 |
| 2,888,717 | 6/1959 | Domitrovic | 220/232 |
| 3,550,638 | 12/1970 | Smith | 138/99 |
| 4,448,218 | 5/1984 | Vetter | 138/99 |
| 4,552,183 | 11/1985 | Chick | 138/97 |
| 4,880,035 | 11/1989 | Vetter | 138/99 |

FOREIGN PATENT DOCUMENTS 359219 10/1931 United Kingdom ................ 138/99

*Primary Examiner*—James E. Bryant, III
*Attorney, Agent, or Firm*—K. S. Cornaby

[57] ABSTRACT

A device for sealing damaged, leaking walls of containers or tubes comprises an inflatable sealing cushion which covers the site of the leak. Said cushion has a flexible counter plate 20 provided, on opposite edge regions, with fastening elements slots 24 for a clamping device surrounding the container or the tube, and an inflatable inner space 30 on the side of the flexible counter plate facing the leak and assembled with said counter plate, said space 30 being accessible from the outside through a nipple 34 and limited by at least one wall 38 and/or 40 made of a rubber-like reinforced material. The inner space 30 is annular and delimits, together with the flexible counter plate 20, a cavity 36 enclosing the leak. A passage 26 connects the inner space 30 of this cavity 36 with the outside of the sealing cushion.

13 Claims, 1 Drawing Sheet

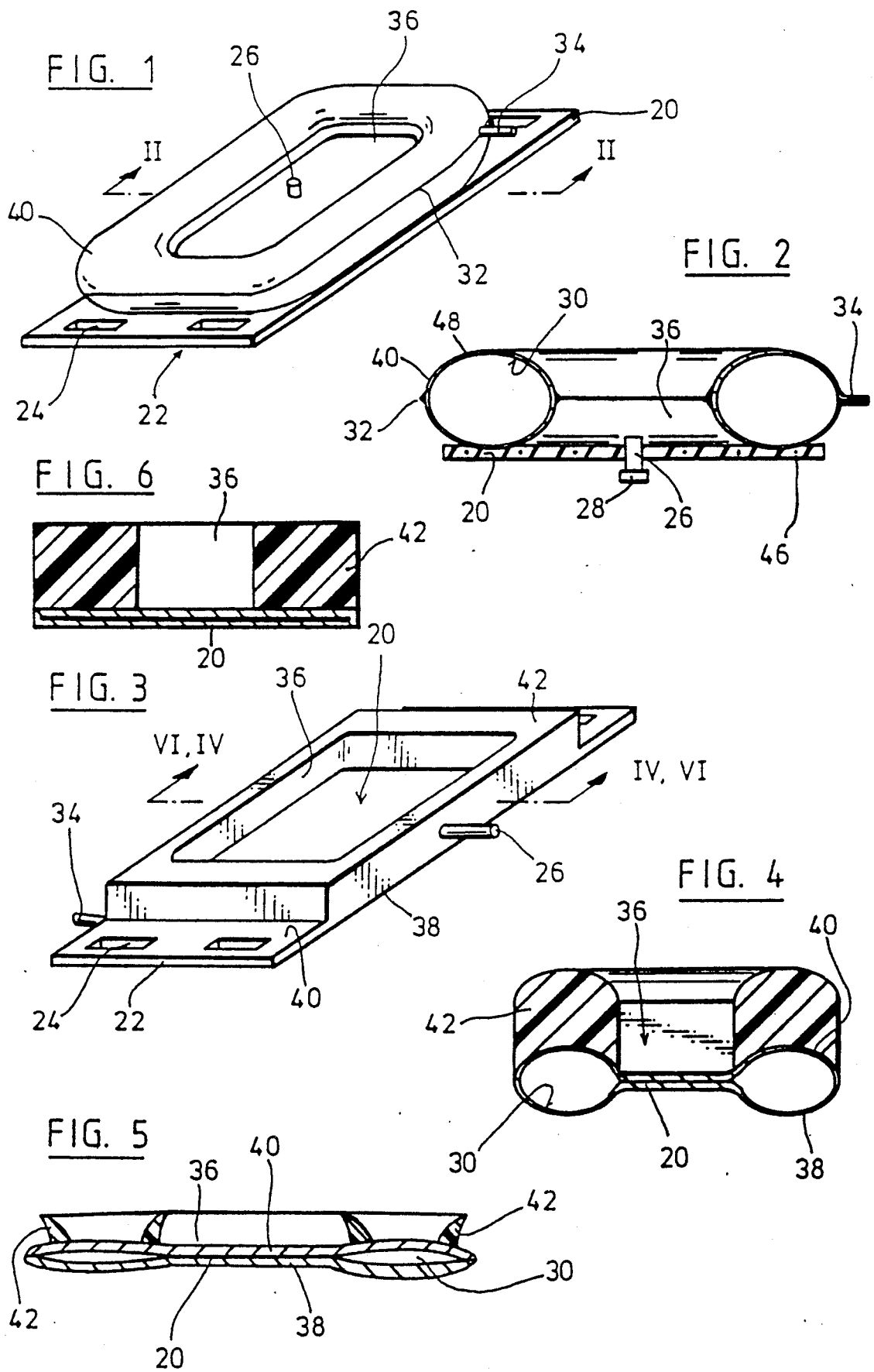

INFLATABLE CUSHION FOR SEALING OFF LEAKS IN CONTAINERS AND PIPES

BACKGROUND OF THE INVENTION

The invention pertains to a device for sealing damaged walls of containers or tubes that leak. It comprises an inflatable sealing cushion which covers the site of the leak. It is provided with a flexible counter plate which on opposite edges has fastening arrangements for a clamping device surrounding the container of the tube. It also embraces an inflatable inner space or ring on the side of the flexible counter plate which faces the leaking side of the tube. This space is accessible from a nipple located outside and is limited by at least one wall that is composed of a rubber-like reinforced material.

This device, designated throughout this document as a device for sealing leakages, is familiar from German Patent Document 27 45 506. In it the counter plate has ideally the shape of a rectangle, and metal rods are inserted into the shorter ends of the rectangle. These metal rods are embraced by a reinforcing that runs in the direction of the longer sides of the rectangle, the attachments of the clamping and reinforcing device being locked to these metal rods.

When employed, the device for sealing damaged and/or leaking sections is mounted by means of the clamping and reinforcing attachments over the leaking section and secured. The inner section of the device is then filled with compressed air or, alternatively, a liquid under pressure In this way the sealing cushion acquires a greater volume and it presses with its lower edge around the portion of the wall that surrounds the leaking section At the same time, it tightens the belts or ropes of the clamping and reinforcing device. Thus, when inflated, the device ensures that a sealing edge is created by the sealing device on the areas of the wall that surround the leaking section The leaking section is thereby sealed off. In this way, leakages of dangerous materials from containers or tubes that have been damaged can be stopped within a relatively short time Subsequent damage that might result—pollution of the environment or explosions—can thus be avoided.

U.S. Pat. No. 3,496,963 also pertains to a sealing device for tubes. In this device, the inflatable cushion that covers the leakage is surrounded on its outer surface by a matching piece that is constructed as a collapsible bell. This bell has a clamping device that is fitted with a moveable/rotatable threaded bolt By tightening the attached nut, the shell can be put under pressure, whereupon the device lies snugly on the tube. The inflatable cushion is firmly attached to its matching part. Essentially, this device is suited for application on cylindrical bodies, and then only for those of a certain diameter; it is unsuitable for general container shapes, for example, containers that are hauled by semi-trailers. One particular disadvantage of the sealing devices that are already in use is that they are used simply to seal a leak, but do not render it possible to extract in some way or pump off the liquid or the gas that is present at the leak site. But this is frequently necessary when accidents occur involving tanker loads A tanker that has been thrown off its wheels often lies in such a position that access to the actual tanker supports is not possible, access being perhaps blocked by other objects, for example, other vehicles or bridges or earthen walls or walls of houses. It is then difficult, and sometimes even impossible with the means that are at one's disposal, to empty the tank that has been sealed off by the sealing device In this way, further rescue attempts can be prevented or even appreciably delayed; especially if, for example, the tank of the vehicle that has suffered an accident contains a dangerous explosive liquid. The problems described here occur, for example, in accidents involving tankers that are transporting gasoline.

The invention addresses this problem. Its purpose is to develop the cushion that is noted in the introduction in such a way that, while the cushion still effects a good seal around the leaking section, a liquid or a gas can be pumped off or respectively discharged via the sealing cushion.

Proceeding from the cushions for sealing leaks that is noted in the introductory remarks this task is solved by having the inner space configured as a ring. Together with the flexible counter plate, it defines a trough or depression that surrounds the leaking section, and an access passage ensures that the inner space of this trough is connected to the outside of the cushion for sealing leaks.

In contrast to the cushions for sealing leaks that are already known and that are described in the introductory remarks, this cushion for sealing leaks does not contact over its total surface area the leaking section and the regions of the damaged walls that completely surround the leak; rather, it makes contact outside the point of leakage and fits snugly on the damaged wall as a ring around the leak. In this way, a hollow space is created between the damaged wall and the cushion for sealing leaks when the latter is placed against a damaged wall. Whereas in the cushions for sealing leaks that are already familiar, it is not possible to create this space because these cushions are in contact over their total surface area with the surface to which they are applied. Expressed in different words: the cushion for sealing leaks that is constructed in accord with the terms of this invention lies like a bell around the leaking section. It constitutes the trough which is filled by the liquid which streams from the leak. Thus, the trough becomes a collecting basin for discharged fluid, and by means of the access that is planned in accord with this invention, the fluid that collects in the trough can be removed.

The fact that the cushion for sealing leaks makes contact by virtue of the ring-shaped inner space in a ring around the leak (contact is no longer over the total surface area), further ensures that the cushion for sealing leaks cannot be damaged by sharp-edged sections which comprise the edge of the leaking section In all, the device for sealing leaks that is in accord with this invention can be employed in all those instances for which the devices for sealing leaks described above could also be employed It can be applied simply and in very many different situations—even when space is severely limited—and it can be stored both without problem and in a minimum of space. In contrast to the devices for sealing leaks that are already known, it has the added advantage that it does not make contact, or makes less contact, with the edge of the leak. That allows liquid or, respectively, gas, to be drawn off.

The term "ring-shaped" is not to be understood as delimiting solely a circle but rather every possible closed area configuration, especially oval ring, a rectangular ring, et cetera The size of the cushions for sealing leaks—and here there is no difference to the cushions for sealing leaks that are already known conforms to the size of the typically occurring leak For practical application oblong-rectangular cushions for sealing leaks with the dimensions 30×60 cm have proven to be suitable and practical By reason of the reinforcing of its walls, the inner space is so capable of withstanding pressure that, even when inflated and applied only loosely and without bracing to a wall, it will not burst when subjected to the maximum pressure The flexible counter plate adapts itself extensively to the curvature of the damaged wall. The clamping devices make it possible to attach it even to the external walls of containers, thereby ensuring that the cushion for sealing leaks does not, when correctly applied, slip sideways away from the leaking section.

Two essentially different types of construction are proposed for the cushion for sealing leaks that is in accord with the invention: In the first version, the cushion for sealing leaks is composed of the flexible counter plate and an inflatable ring that is joined to this counter plate and that is constructed of reinforced rubber material which, for example, is in the shape of a tire, but ideally is rectangular or, respectively, oval in shape In the other version, the cushion for sealing leaks is constructed of layered, hoop-shaped rubber material that is reinforced. The cushion for sealing leaks consists essentially of two walls, a cushion wall that faces away from the leak and a cushion wall that faces to the leak These walls can hang together as one piece or can be cut separately. When cut separately, both walls of the cushion should be reinforced in different directions so that the wall of the cushion that faces the leak can extend itself more forcefully than the wall that faces away from the leak. Both the walls of the cushion are linked not only around the edges but also in the center where the trough is formed. Thus, when inflated, they constitute a body which resembles an inflatable rubber boat. In such a construction, it is advantageous to mount, on the side of the cushion that faces the leak, in the region of the inflatable inner space, a ring-shaped seal that totally surrounds the inner space, for example, a sealing lip or raised edge of rubber material, or one or more sealing edges, and so on. They ensure that no leakages occur between the cushion for sealing leaks and the damaged wall. These leakages occur because the cushion for sealing leaks becomes stiffer when inflated and takes on its own shape, i.e., it no longer is as flexible as it was when uninflated.

In contrast to suction bells, which when applied to leaking sections of damaged containers or tubes, work with negative pressure, the cushion for sealing leaks that is constructed in accord with the invention enjoys the advantage of a higher degree of adhesive/sealing pressures and a closed inner space The higher adhesive pressures are achieved by means of fill pressures which total several times—for example, six times—atmospheric pressure.

Further advantages and characteristics of the invention derive from the remaining claims sought and from the following description of three types of the invention, these types being understood as not limiting in any way the invention. These types are described in more detail below with reference to the drawings.

IN THE DRAWINGS

FIG. 1 shows a perspective representation of a cushion for sealing leaks, having a ring-shaped inner space that, when inflated, is like a pipe, and further has a flexible counter plate that is firmly connected to the jacket of the inner space.

FIG. 2 shows a cross-section with altered scale along the cross-section II—II in FIG. 1.

FIG. 3 shows a perspective representation of a cushion for sealing leaks that has been manufactured of reinforced material The cushion is not inflated. It has a raised sealing edge/abutment.

FIG. 4 shows a cut along the cross-section line IV—IV in FIG. 3 with the cushion inflated.

FIG. 5 shows a cross-cut corresponding to FIG. 2 or 4 through a third type that is constructed in accord with the invention.

FIG. 6 shows a cut along the cross-section line VI—VI in FIG. 3 with the cushion deflated.

DETAILED DESCRIPTION OF THE ILLUSTRATED EMBODIMENTS

The cushion for sealing leaks that is constructed according to the first version shown in FIGS. 1 AND 2 has a flexible counter plate 20 that is rectangular in shape, the length being 60 cm, the width 30 cm and the thickness 15 mm. It is manufactured of reinforced rubber material, ideally rubber that has been reinforced with steel cords (46); and it has on its opposite edge regions, which in this instance are the narrow sides 22, slots 24 which run in the direction of the narrow side and through which clamping straps, which have dimensions similar to the safety belts of vehicles, can be inserted. Finally, a passage 26 is included in the counter plate 20. This passage transverses the counter plate 20 and has, on the side that faces away from the leak a linking connection 28 for attaching a pipe or a valve. The passage itself is a tube with a clear internal diameter of 25 mm. This tube is constructed as a metal pipe and is so stiff under pressure that even when inflated and in actual use it cannot be constricted or have its wall pressed together.

A hose-like body that defines a ring-shaped inner area 30 is firmly attached on the main surface of the counter plate 20. The wall is constructed of a rubber-like, reinforced by a reinforcement (48) material. In the type illustrated, it is constructed of two ring-shaped sections that are linked together in the region of a plane, seam 32, that runs parallel to the counter plate 20. It is also possible to construct it without a seam.

The inner space 30 is accessible via a nipple 34 that is constructed as a piece of piping It runs parallel to the plane of the counter plate 20, and is advantageous when the cushion is being used in constricted spaces and when being stored. The nipple 34 is sited in a corner section of the inner space 30. The width of the inner space 30 corresponds to the breadth of the counter plate 20, while the length of the inner space 30 is somewhat shorter than the counter plate so that the total of four slots is accessible at all times.

The section of the counter plate 20 that remains free within the wall of the inner space 30—the passage 26 is sited in this region—and the parts of the walls of the inner space 30 which point inwards define a trough 36 below which, in practical application, the leaking section (not shown) of a damaged wall (also not shown) is sited.

The cushion for sealing leaks constructed according to the type delimited in the FIGS. 3 and 4 is manufactured in one single production process from a section of ribbed rubber material that was not vulcanized before treatment, but that was vulcanized hot and reinforced in a press. In this cushion for sealing leaks, the flexible counter plate 20 is constructed essentially by a cushion wall that faces away from the leak 38, but also in part by a cushion wall that faces the leak 40. Both these walls, which reveal the same rectangular dimensions, are united together not only along their rectangular sides, which is to say along their edges, but also in the region of a middle rectangle. In this way, the two cushion walls 38, 40 define the ring-shaped, hose-like inner space 30 to which attention is drawn in FIG. 4. This inner space 30 is accessible via a nipple 34 in a manner that is well known. This nipple is sited in a corner section and runs parallel to the planes of the walls 38, 40.

Mounted on the side of the cushion that faces the leak—in the FIGS. 3 and 4 it is the upper cushion wall 40—in the vicinity, and only in the vicinity of the inner space 30 is a sealing abutment/raised lip 42. It is sited directly on the cushion wall 40 and connected to it. In the type of sealing cushion illustrated, it has essentially the shape of a rectangular frame the length of which is somewhat shorter than the length of both the cushion walls 38, 40. Its width corresponds to the width of both the cushion walls 38, 40. It has a rectangular recess which is so constructed that its width is approximately 8 cm. whereas in another type of the device, its width is 4 cm. Its thickness is approximately 4 cm. This framework sealing lip/edge 42 can be constructed by cutting from non-reinforced rubber material—from recycled rubber, for example—a plate of 4 cm thick rubber so that it fits the given rectangular dimensions. From this insert a rectangle is then cut on the inside so that a frame width remains in the given dimensions.

The passage 26 is conducted through one of the long walls of the frame-shaped sealing edges 42 This passage is also constructed as pipe that is resistant to pressure, and it runs parallel to the plane of the walls 38, 40. When the cushion is to be employed in limited space, this is of greater advantage than a construction that runs at an angle to the counter plate 20 such as would be the case if the cushion were designed according to the first type of the device.

In a model of the device constructed in accord with FIGS. 3 and 4, the trough 36 is limited by the side of the cushion that faces the leak 40. More specifically, it is defined by the surface over which in their middle sections, the two cushion walls 38, 40 are united together and by the inner surface of the sealing lip 42. Both the sides 38 of the cushion are joined together along their surfaces in the vicinity of their narrow edges, two slits 24 being incorporated once again in each narrow side.

The side of the cushion that faces away from the leak is reinforced along its long side. This is effected by, for example, steel cords which are conducted around the edges, but especially the outer edges of the slits 24. For purposes of reinforcing a longitudinal element, for example, a metal rod, can be incorporated between the outer edges and the narrow edge. This rod is embraced by the reinforcing threads. The side of the cushion 40 that faces the leak is reinforced diagonally so that it can expand more strongly than the side that faces away from the leak 38. Instead of steel cord threads, it is possible to utilize as reinforcing aramide or equivalent tear-resistant material.

In a modified version, it is also possible to construct as a frame the section for the side of the cushion that faces the leak. Thus, the trough 36 to the side that faces away from the leak is delimited solely by the side of the cushion 38. The formation of the tie between the two walls of the cushion 38, 40 that is mounted in the middle region—it is shown in the drawing—has, however, the advantage that no problems of sealing can occur there, for it is not necessary to effect sealing.

The third model of the device—it is shown schematically in FIG. 5—is also constructed of two rectangular cushion walls 38, 40 that are the same size. The cushion for sealing leaks is shown partly inflated only in accord with FIGS. 2 and 4.

The model constructed in accord with FIG. 5 conforms essentially to the conformation of FIGS. 3 and 4. Here, however, a sealing edge of solid material is not incorporated. Rather, the sealing edge 42 is constructed of two ring-shaped sealing lips—they bear the reference number 42—which are linked to the side of the cushion that faces the leak 40. The projected seal is a ring-shaped, inner sealing lip which is slightly inclined inwards and which, with its inner surface, delimits the trough 36 together with the central area of linking of both walls of the cushion 38, 40 The sealing lip that is sited externally 42 is also ring-shaped. It is sited on the outer edge of the hose-shaped inner space 30 and is inclined outwards. By reason of the two sealing lips that constitute the sealing abutment 42 a circular space 44 is delimited when the cushion is applied to a wall that is to be sealed. This circular space can, by virtue of the placement of the sealing lips, allow air to be conducted off to the outside when the cushion is placed against the damaged wall. In this way, cohesive pressure is created on the wall that is sealed off. In an example constructed in accordance with FIGS. 3 and 4, both the cushion walls 38, 40 are reinforced, and the sealing lips of the sealing abutment 42 are constructed of stiff, non-reinforced rubber material. The sealing cushion that is constructed in accord with this type can, through vulcanizing under heat, be manufactured in one single process from a suitable section or respectively from sealing blocks that have been prepared in advance.

The passage 26 is preferably sited in a corner section, but, as is demonstrated in the type constructed according to FIG. 3, running parallel to the shorter rectangular side. It is important to allow sufficient material between the passage 26 and the wall of the damaged container or pipe so that a proper seal can be effected at this place, for by reason of the passage 26 the sealing lip—for example—in a type constructed according to the FIGS. 3 and 4 is stiffened locally and is thus not as yielding as at other places. Accordingly, the passage 26, as is shown in FIG. 3, is sited if possible in the plane of the counter plate 20, which is to say at the greatest possible distance from the surface along which the cushion for sealing leaks is applied to the damaged wall. In a type constructed in accord with FIGS. 1 and 2, it is possible to site the passage between the casing of the inner space 30 and the flexible counter plate 20.

It has also proven advantageous to make provision for several passages, siting them, for example, in adjoining or diagonally opposite corner regions and linking them externally via a tube/hose by means of a Y-shaped section. In this way, it is possible to ensure that the inner space 30 is virtually completely emptied.

I claim:

1. Inflatable cushion for sealing off leaks in containers and pipes comprising a flexible counter plate that is provided on opposite edge regions with fastening elements for a clamping device surrounding the container or tube; an inflatable inner space of annular configuration, a nipple, said inflatable inner space is accessible from outside of the counter plate through said nipple, said inflatable inner space is limited by at least one wall made of a rubber-like reinforced material, said inflatable inner space is arranged on the side of the said counter plate facing the leak and assembled with the said counter plate, said inflatable inner space and the said counter plate delimiting a trough that covers the leak; and an access passage in the inflatable cushion for removal of a fluid that collects in the said trough.

2. Inflatable cushion according to claim 1, wherein the inflatable cushion exhibits faces and the flexible counter plate and the inflatable inner space is formed by a side of the cushion that faces the leak and a side of the cushion that faces away from the leak, the faces of the cushion being constructed of reinforced, layered, rubber-like material and linked along their edges as well as in the region of the trough so that the inflatable inner space is formed between the union along the edges and the region of the trough.

3. Inflatable cushion according to claim 1, wherein the inflatable inner space is defined by a hose-liked body that is connected with the counter plate and that effects sealing.

4. Inflatable cushion according to claim 1, wherein a sealing lip is mounted on the side of the inflatable inner space that faces the leak which sealing lip is sited directly on a cushion wall and connected to it.

5. Inflatable cushion according to claim 4, wherein the sealing lip has the shape of a rectangular frame and the access passage protrudes through a wall of the said frame-shaped sealing lip.

6. Inflatable cushion according to claim 5, wherein the sealing lip is constructed of solid material that has essentially a square cross-section.

7. Inflatable cushion according to claim 6, wherein the sealing lip forms a gutter which, in conjunction with a wall of the container or tube defines an annular space.

8. Inflatable cushion according to claim 1, wherein the access passage runs parallel to the counter plate.

9. Inflatable cushion according to claim 1, wherein the counter plate is rectangular in shape.

10. Inflatable cushion according to claim 1, wherein the inflatable cushion is manufactured in a press under heat vulcanization, in one production process, from rubber material that is reinforced and ribbed, but that before the vulcanization process was not vulcanized.

11. Inflatable cushion according to claim 1, wherein the inflatable cushion is built up through gluing from sections that had been prepared accordingly from reinforced, rubber-like material.

12. Inflatable cushion according to claim 1, wherein the access passage is located in the vicinity of a corner region of the inflatable cushion.

13. Inflatable cushion according to claim 1, wherein the access passage is located in a spot of the inflatable cushion that allows ample space between the access passage and a wall of the container or tube to effect sealing in this region.

* * * * *